United States Patent
Djakovic

(10) Patent No.: US 10,819,775 B2
(45) Date of Patent: Oct. 27, 2020

(54) SYSTEMS AND METHODS FOR SERVER FAILOVER AND LOAD BALANCING

(71) Applicant: iDevices, LLC, Avon, CT (US)

(72) Inventor: Vladan Djakovic, San Francisco, CA (US)

(73) Assignee: IDEVICES, LLC, Avon, CT (US)

( * ) Notice: Subject to any disclaimer, the term of this patent is extended or adjusted under 35 U.S.C. 154(b) by 93 days.

(21) Appl. No.: 16/255,374

(22) Filed: Jan. 23, 2019

(65) Prior Publication Data

US 2019/0158585 A1 May 23, 2019

Related U.S. Application Data

(63) Continuation of application No. 15/166,218, filed on May 26, 2016, now abandoned.

(60) Provisional application No. 62/179,969, filed on May 26, 2015.

(51) Int. Cl.
*H04L 29/08* (2006.01)

(52) U.S. Cl.
CPC ...... *H04L 67/1019* (2013.01); *H04L 67/1023* (2013.01); *H04L 67/1034* (2013.01)

(58) Field of Classification Search
USPC ........................................................ 709/226
See application file for complete search history.

(56) References Cited

U.S. PATENT DOCUMENTS

| | | | |
|---|---|---|---|
| 7,752,626 B1 | 7/2010 | Pandey et al. | |
| 8,150,957 B1 | 4/2012 | Masters et al. | |
| 8,902,787 B2 | 12/2014 | Qiu et al. | |
| 2003/0009538 A1* | 1/2003 | Shah | H04L 63/0281 709/219 |
| 2004/0250248 A1 | 12/2004 | Halpern et al. | |
| 2006/0013224 A1 | 1/2006 | Chiba | |
| 2010/0223621 A1* | 9/2010 | Joshi | H04L 29/12066 718/105 |
| 2010/0333104 A1 | 12/2010 | Unnikrishnan et al. | |
| 2011/0289225 A1* | 11/2011 | Manapragada | H04L 67/1008 709/227 |
| 2013/0227165 A1 | 8/2013 | Liu | |
| 2014/0267571 A1 | 9/2014 | Periyannan et al. | |
| 2015/0063364 A1 | 3/2015 | Nicira | |

FOREIGN PATENT DOCUMENTS

| | | |
|---|---|---|
| JP | 2001-167074 | 6/2001 |
| JP | 2001-282737 | 10/2001 |
| JP | 2005-031736 | 2/2005 |

OTHER PUBLICATIONS https://en.wikipedia.org/w/index.php?title=Rendezvous_hashing&oldid=655478040. Apr. 8, 2015. 4 pages.

* cited by examiner

*Primary Examiner* — Glenton B Burgess
*Assistant Examiner* — Marshall M McLeod
(74) *Attorney, Agent, or Firm* — Michael Best & Friedrich, LLP

(57) ABSTRACT

Systems and methods for server failover and/or load balancing are provided herein. Systems for server failover and load balancing may include a computer system in electronic communication over a network with one or more client applications, the computer system including a plurality of servers, and an engine stored on and executed by a client, the engine configured to allow one or more clients to select a target server among the plurality of servers using a client application identifier.

16 Claims, 13 Drawing Sheets

| ENTRY | SERVER IP ADDRESS | SERVER CAPABILITIES | |
|---|---|---|---|
| 1 | IP ADDRESS$_1$ | COMMUNICATION | 602 |
| 2 | IP ADDRESS$_2$ | COMMUNICATION | 604 |
| 3 | IP ADDRESS$_3$ | COMMUNICATION STORAGE | 606 |
| 4 | IP ADDRESS$_4$ | COMMUNICATION STORAGE | 608 |
| 5 | IP ADDRESS$_5$ | COMMUNICATION STORAGE | 610 |
| 6 | IP ADDRESS$_6$ | COMMUNICATION STORAGE | 612 |
| 7 | IP ADDRESS$_7$ | COMMUNICATION STORAGE | 614 |
| 8 | IP ADDRESS$_8$ | COMMUNICATION STORAGE | 616 |
| 9 | IP ADDRESS$_9$ | STORAGE | 618 |
| 10 | IP ADDRESS$_{10}$ | STORAGE | 620 |
| ⋮ | ⋮ | ⋮ | 622 |
| | | | 624 |
| n-1 | IP ADDRESS$_{n-1}$ | ⋮ | 626 |
| n | IP ADDRESS$_n$ | ⋮ | 628 |

*FIG. 6*

| ENTRY | SERVER IP ADDRESS | SERVER CAPABILITIES |
|---|---|---|
| 1 | IP ADDRESS$_1$ | COMMUNICATION |
| 2 | IP ADDRESS$_2$ | COMMUNICATION |
| 3 | IP ADDRESS$_3$ | COMMUNICATION STORAGE |
| 4 | IP ADDRESS$_4$ | COMMUNICATION STORAGE |
| 5 | IP ADDRESS$_5$ | COMMUNICATION STORAGE |
| 6 | IP ADDRESS$_6$ | COMMUNICATION STORAGE |
| 7 | IP ADDRESS$_7$ | COMMUNICATION STORAGE |
| 8 | IP ADDRESS$_8$ | COMMUNICATION STORAGE |

*FIG. 7*

| ENTRY | SERVER IP ADDRESS | SERVER CAPABILITIES |
|---|---|---|
| 1 | IP ADDRESS$_3$ | COMMUNICATION STORAGE |
| 2 | IP ADDRESS$_4$ | COMMUNICATION STORAGE |
| 3 | IP ADDRESS$_5$ | COMMUNICATION STORAGE |
| 4 | IP ADDRESS$_6$ | COMMUNICATION STORAGE |
| 5 | IP ADDRESS$_7$ | COMMUNICATION STORAGE |
| 6 | IP ADDRESS$_8$ | COMMUNICATION STORAGE |
| 7 | IP ADDRESS$_9$ | STORAGE |
| 8 | IP ADDRESS$_{10}$ | STORAGE |

*FIG. 8*

| ENTRY | SERVER IP ADDRESS | IP ADDRESS COMBINED WITH CLIENT APPLICATION IDENTIFIER (CAI) | HASH OUT | |
|---|---|---|---|---|
| 1 | IP ADDRESS$_1$ | IP ADDR$_1$ & CAI | HASH OUT$_1$ | 902 |
| 2 | IP ADDRESS$_2$ | IP ADDR$_2$ & CAI | HASH OUT$_2$ | 904 |
| 3 | IP ADDRESS$_3$ | IP ADDR$_3$ & CAI | HASH OUT$_3$ | 906 |
| 4 | IP ADDRESS$_4$ | IP ADDR$_4$ & CAI | HASH OUT$_4$ | 908 |
| 5 | IP ADDRESS$_5$ | IP ADDR$_5$ & CAI | HASH OUT$_5$ | 910 |
| 6 | IP ADDRESS$_6$ | IP ADDR$_6$ & CAI | HASH OUT$_6$ | 912 |
| 7 | IP ADDRESS$_7$ | IP ADDR$_7$ & CAI | HASH OUT$_7$ | 914 |
| 8 | IP ADDRESS$_8$ | IP ADDR$_8$ & CAI | HASH OUT$_8$ | 916 |

*FIG. 9*

| ENTRY | SERVER IP ADDRESS | |
|---|---|---|
| 1 | IP ADDRESS$_7$ | 1002 |
| 2 | IP ADDRESS$_3$ | 1004 |
| 3 | IP ADDRESS$_1$ | 1006 |
| 4 | IP ADDRESS$_2$ | 1008 |
| 5 | IP ADDRESS$_6$ | 1010 |
| 6 | IP ADDRESS$_5$ | 1012 |
| 7 | IP ADDRESS$_4$ | 1014 |
| 8 | IP ADDRESS$_8$ | 1016 |

HASH OUT$_7$ > HASH OUT$_3$ > HASH OUT$_1$ > HASH OUT$_2$
HASH OUT$_6$ > HASH OUT$_5$ > HASH OUT$_4$ > HASH OUT$_8$

FIG. 10

| ENTRY | SERVER IP ADDRESS | IP ADDRESS COMBINED WITH CLIENT APPLICATION IDENTIFIER (CAI) | HASH OUT | |
|---|---|---|---|---|
| 1 | IP ADDRESS$_3$ | IP ADDR$_3$ & CAI | HASH OUT$_3$ | 1102 |
| 2 | IP ADDRESS$_4$ | IP ADDR$_4$ & CAI | HASH OUT$_4$ | 1104 |
| 3 | IP ADDRESS$_5$ | IP ADDR$_5$ & CAI | HASH OUT$_5$ | 1106 |
| 4 | IP ADDRESS$_6$ | IP ADDR$_6$ & CAI | HASH OUT$_6$ | 1108 |
| 5 | IP ADDRESS$_7$ | IP ADDR$_7$ & CAI | HASH OUT$_7$ | 1110 |
| 6 | IP ADDRESS$_8$ | IP ADDR$_8$ & CAI | HASH OUT$_8$ | 1112 |
| 7 | IP ADDRESS$_9$ | IP ADDR$_9$ & CAI | HASH OUT$_9$ | 1114 |
| 8 | IP ADDRESS$_{10}$ | IP ADDR$_{10}$ & CAI | HASH OUT$_{10}$ | 1116 |

*FIG. 11*

| ENTRY | SERVER IP ADDRESS | |
|---|---|---|
| 1 | IP ADDRESS$_7$ | 1202 |
| 2 | IP ADDRESS$_3$ | 1204 |
| 3 | IP ADDRESS$_9$ | 1206 |
| 4 | IP ADDRESS$_{10}$ | 1208 |
| 5 | IP ADDRESS$_5$ | 1210 |
| 6 | IP ADDRESS$_5$ | 1212 |
| 7 | IP ADDRESS$_4$ | 1214 |
| 8 | IP ADDRESS$_8$ | 1216 |

HASH OUT$_7$ > HASH OUT$_3$ > HASH OUT$_9$ > HASH OUT$_{10}$ > HASH OUT$_6$ > HASH OUT$_5$ > HASH OUT$_4$ > HASH OUT$_8$

*FIG. 12*

SYSTEMS AND METHODS FOR SERVER FAILOVER AND LOAD BALANCING

CROSS-REFERENCE TO RELATED APPLICATIONS

This application is a continuation of U.S. patent application Ser. No. 15/166,218, filed May 26, 2016, which claims benefit under 35 U.S.C. § 119(e) to U.S. Provisional Patent Application No. 62/179,969 filed May 26, 2015, which is incorporated herein by reference in its entirety and made a part hereof.

FIELD OF THE DISCLOSURE

The present disclosure relates generally to systems, methods and/or media for use in server failover and/or load balancing. More specifically, the present disclosure relates to systems, methods and/or media for use in server failover and/or load balancing using clients.

BACKGROUND INFORMATION

Backend servers that provide services to clients need to be available at all times. When a particular server fails, a mechanism needs to be in place to route clients to one or more alternate servers. For example, Web services typically utilize a front-end load balancer or router, which sends requests to functioning servers. While fast, the load balancer or router is itself a critical single point of failure and introduces additional costs. Alternatively, a new server could be instantiated and the DNS (domain name system) entry for the service could be changed to point to the new server. However, there are significant delays in propagating new DNS entries.

SUMMARY OF THE INVENTION

In the mechanisms described, the routing of requests and changing of pointers is performed on the backend side (e.g., on the servers themselves) without client involvement.

It has been determined that it is possible to involve and/or otherwise utilize clients in server failover and/or load balancing.

In some embodiments, a system (and/or method and/or medium) may provide load balancing, server failover, scaling, data localization and/or redundancy. The system (and/or method and/or medium) may achieve load balancing by uniformly selecting a target server over all servers based on a random client application identifier (CAI). The system (and/or method and/or medium) may provide failover by selecting appropriate alternate servers. The system (and/or method and/or medium) may achieve scalability by extending system capacity by adding new servers and informing directory services about the new additions. The system (and/or method and/or medium) may provide data localization and redundancy by limiting data replication to the first N servers on the CAI-specific Highest Random Weight (HRW) sorted list. The system (and/or method and/or medium) may provide the above features so when two or more clients agree on the same CAI, they will always select the same server or the same subset of servers. The system (and/or method and/or medium) may provide these benefits without any centralized services, bottlenecks, and/or single points of failure on the server side. There is no need for load balancers, third party directory involvement (e.g., DNS), or system-wide data replication.

In some embodiments, a system comprises an engine executed by one or more clients to select a target server or server subset among a plurality of servers, using a client application identifier. In some embodiments, two or more clients, using the same client application identifier, select the same target server or server subset. In some embodiments, each of the plurality of servers is coupled to the one or more clients and configured to provide one or more service classes, the services classes including application services and directory services. In some embodiments, the application services on each server serve only a subset of all client applications. In some embodiments, the directory services of each server are configured to provide a list of servers, each server tagged with the application services that server supports. In some embodiments, the engine includes a service mapping subsystem configured to map each client application identifier to the target server or server subset. In some embodiments, the service mapping subsystem is configured to map said client application identifier using Highest Random Weight. In some embodiments, the client application identifier comprises a large number. In some embodiments, the engine is executed by a first one of the one or more clients to select a target server or server subset among the plurality of servers using the client application identifier; and the engine is executed by a second one of the one or more clients to select the same target server or server subset among the plurality of servers using the client application identifier. In some embodiments, the client application identifier is a large number. In some embodiments, the large number comprises at least 128 bits. In some embodiments, the large number comprises at least 512 bits.

In some embodiments, the system comprises a computer system that is in electronic communication over a network (or otherwise coupled (via any type(s) of communication link(s))) with one or more clients, the computer system including a plurality of servers, and an engine stored on and/or executed by the one or more clients, the engine configured to permit the one or more client applications to select a target server among the plurality of servers using a client application identifier. In some embodiments, the client application identifier is a large number. In some embodiments, the large number comprises at least 128 bits. In some embodiments, the large number comprises at least 512 bits.

In some embodiments, a method comprises electronically (or otherwise) receiving a directory list with server identities for a plurality of servers, electronically (or otherwise) receiving an application specific directory list using a client application identifier to identify servers with a desired application, applying, by an engine stored on and/or executed by a client, a Highest Random Weight to the application specific directory list to electronically (or otherwise) generate a client application identifier specific sorted list of servers that provide the desired application, and attempting by the client to electronically (or otherwise) contact a server from the client application identifier specific soiled list of servers by starting at the top and working down the list. In some embodiments, the client application identifier is a large number. In some embodiments, the sorted list may comprise any type(s) of information, in any form(s), that defines an order in which to attempt to contact servers until at least one functioning one of the servers is contacted. In some embodiments, the large number comprises at least 128 bits. In some embodiments, the large number comprises at least 512 bits.

In some embodiments, a method comprises: executing, by one or more clients, an engine to select a target server or server subset among a plurality of servers, using a client application identifier. In some embodiments, two or more clients, using the same client application identifier, select the same target server or server subset. In some embodiments, each of the plurality of servers is coupled to the one or more clients and configured to provide one or more service classes, the services classes including application services and directory services. In some embodiments, the application services on each server serve only a subset of all client applications. In some embodiments, the directory services of each server are configured to provide a list of servers, each server tagged with the application services that server supports. In some embodiments, the engine includes a service mapping subsystem configured to map each client application identifier to the target server or server subset. In some embodiments, the service mapping subsystem is configured to map said client application identifier using Highest Random Weight. In some embodiments, the client application identifier comprises a large number. In some embodiments, executing an engine to select a target server or server subset among a plurality of servers, using a client application identifier comprises: executing, by a first one of the one or more clients, an engine to select a target server or server subset among a plurality of servers, using a client application identifier; and executing, by a second one of the one or more clients, the engine to select the target server or server subset among the plurality of servers, using the client application identifier. In some embodiments, executing an engine to select a target server or server subset among a plurality of servers, using a client application identifier comprises: receiving, by an engine executed by a client, information indicative of identifies of servers that provide a desired application; and generating, by the engine executed by the client, based at least in part on the information and a client application identifier, a client application identifier specific sorted list of servers that provide the desired application. In some embodiments, the sorted list may comprise any type(s) of information, in any form(s), that defines an order in which to attempt to contact servers until at least one functioning one of the servers is contacted. In some embodiments, the large number comprises at least 128 bits. In some embodiments, the large number comprises at least 512 bits.

In some embodiments, a non-transitory computer-readable medium has computer-readable instructions stored thereon that, if executed by a computer system, result in a method comprising: executing, by one or more clients, an engine to select a target server or server subset among a plurality of servers, using a client application identifier. In some embodiments, two or more clients, using the same client application identifier, select the same target server or server subset. In some embodiments, each of the plurality of servers is coupled to the one or more clients and configured to provide one or more service classes, the services classes including application services and directory services. In some embodiments, the application services on each server serve only a subset of all client applications. In some embodiments, the directory services of each server are configured to provide a list of servers, each server tagged with the application services that server supports. In some embodiments, the engine includes a service mapping subsystem configured to map each client application identifier to the target server or server subset. In some embodiments, the service mapping subsystem is configured to map said client application identifier using Highest Random Weight. In some embodiments, the client application identifier comprises a large number. In some embodiments, executing an engine to select a target server or server subset among a plurality of servers, using a client application identifier comprises: executing, by a first one of the one or more clients, an engine to select a target server or server subset among a plurality of servers, using a client application identifier; and executing, by a second one of the one or more clients, the engine to select the target server or server subset among the plurality of servers, using the client application identifier. In some embodiments, executing an engine to select a target server or server subset among a plurality of servers, using a client application identifier comprises: receiving, by an engine executed by a client, information indicative of identifies of servers that provide a desired application; and generating, by the engine executed by the client, based at least in part on the information and a client application identifier, a client application identifier specific sorted list of servers that provide the desired application. In some embodiments, the sorted list may comprise any type(s) of information, in any form(s), that defines an order in which to attempt to contact servers until at least one functioning one of the servers is contacted. In some embodiments, the large number comprises at least 128 bits. In some embodiments, the large number comprises at least 512 bits.

BRIEF DESCRIPTION OF THE DRAWINGS

The foregoing features of the disclosure will be apparent from the following Detailed Description, taken in connection with the accompanying drawings, in which:

FIG. 6 is a graphical representation of a list (or other definition), in accordance with some embodiments;

FIG. 7 is a graphical representation of a list (or other definition), in accordance with some embodiments;

FIG. 8 is a graphical representation of a list (or other definition), in accordance with some embodiments;

FIG. 9 is a graphical representation of a list (or other definition) prior to sorting after hashing, in accordance with some embodiments;

FIG. 10 is a graphical representation of a list (or other definition), in accordance with some embodiments;

FIG. 11 is a graphical representation of a list (or other definition) prior to sorting after hashing, in accordance with some embodiments;

FIG. 12 is a graphical representation of a list (or other definition), in accordance with some embodiments.

DETAILED DESCRIPTION OF EMBODIMENTS OF THE INVENTION

The present disclosure relates generally to systems and methods for server failover and/or load balancing. More specifically, the present disclosure utilizes clients, which are more numerous than servers, to address server failover and/or load balancing and/or other tasks. Accordingly, the server system is simplified as the server system is not responsible for providing uninterrupted service to clients.

Instead, each client is in charge of finding a functioning server. At the same time, the server selection method guarantees that client-specific information will be available on the server chosen.

Figure 1:
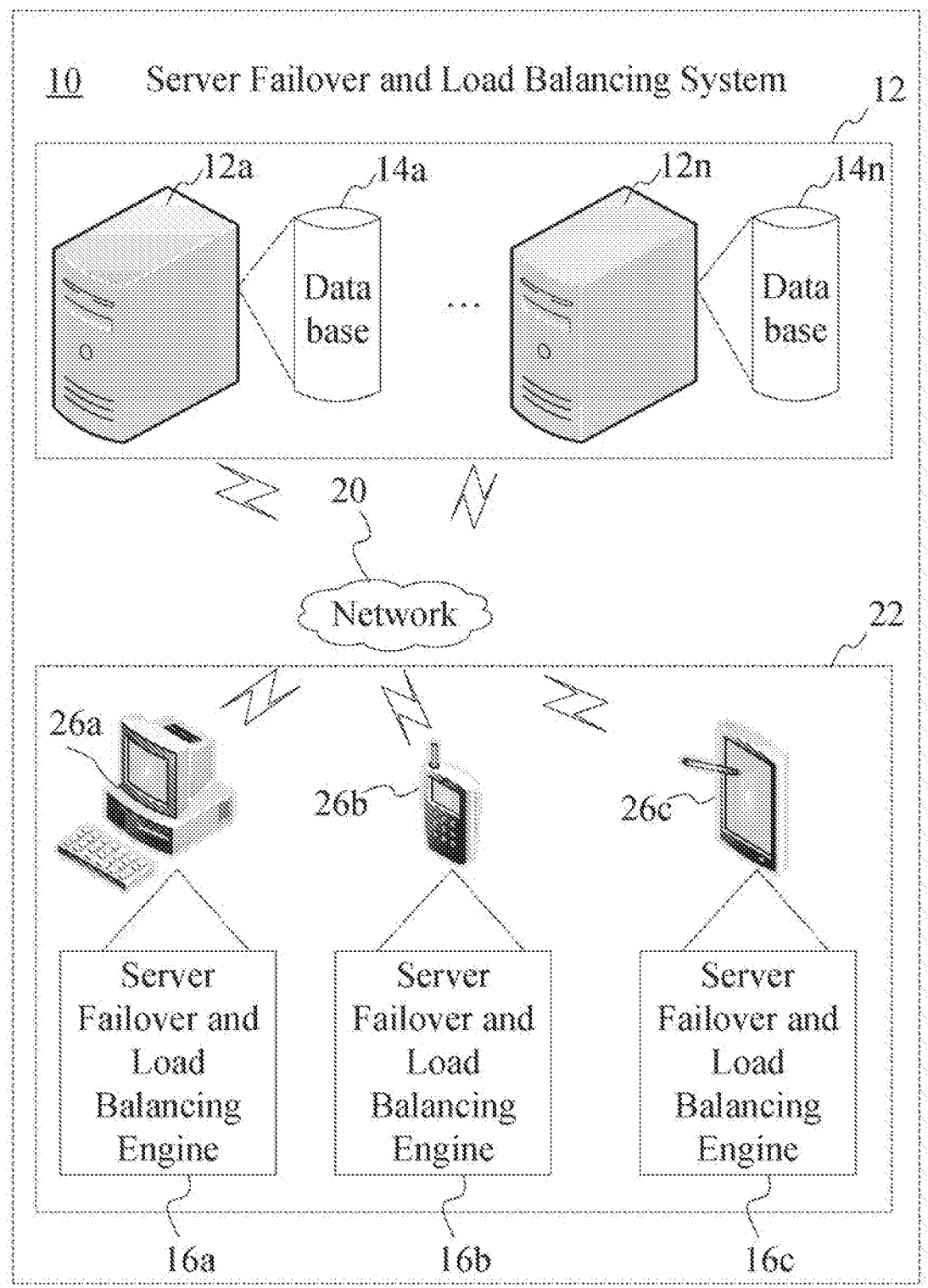
FIG. 1 is a diagram showing a server failover and load balancing system, in accordance with some embodiments.

FIG. 1 is a diagram showing a server failover and load balancing system 10, in accordance with some embodiments.

Referring to FIG. 1, in accordance with some embodiments, the server failover and load balancing system 10 comprises a plurality of servers 12 (e.g., 12a-12n) and one or more clients 22 (e.g., clients 26a-26c). Each of the one or more clients 22 (e.g., clients 26a-26c) may include a server failover and load balancing engine (e.g., server failover and load balancing engines 16a-16c, respectively). Each of the plurality of servers 12 may comprise any suitable type(s) of computer servers (e.g., a server with an INTEL microprocessor, multiple processors, multiple processing cores, etc.) running any suitable operating system (e.g., Windows by Microsoft, Linux, etc.). One or more of the plurality of servers 12 (e.g., servers 12a-12n) may include a database (e.g., databases 14a-14n, respectively) stored therein or operatively connected thereto. Each database may be stored on its server, or located externally therefrom (e.g., in a separate database server in communication with the server failover and load balancing system 10). As further described below, one or more of the plurality of servers 12 may also include a server failover and load balancing engine (not shown) that may be the same as and/or similar to the server failover and load balancing engines 16a-16c. Each of the plurality of servers 12 is remotely accessible such that it can communicate, through a network 20 (and/or via any other type(s) of communication link(s)), with one or more of the one or more clients 22. Each of the one or more clients 22 may include any type(s) of client device (e.g., a personal computer system 26a, a smart cellular telephone 26b, a tablet computer 26c, and/or other electronic devices). Network communication may be over the Internet using standard TCP/IP communications protocols (e.g., hypertext transfer protocol (HTTP), secure HTTP (HTTPS), file transfer protocol (FTP), electronic data interchange (EDI), etc.), through a private network connection (e.g., wide-area network (WAN) connection, emails, electronic data interchange (EDI) messages, extensible markup language (XML) messages, file transfer protocol (FTP) file transfers, etc.), or any other suitable wired or wireless electronic (or otherwise) communications format and system as should be understood by those of ordinary skill in the art.

As can be seen, the system 10 is a distributed system, which removes any single point of failure.

In accordance with some embodiments, the system 10 provides services in two basic service classes: directory services and application services. Each of the plurality of servers 12 (sometimes referred to herein as nodes) in the system 10 can provide services in one or both of such service classes (i.e. directory services and application services). In some embodiments, the application services include real time communication services (e.g., a real time communication session between two or more clients) and/or storage services (e.g., use of read/write storage by one or more clients).

In some embodiments, all directory services on all nodes contain service information about the entire system. In contrast thereto, application services (e.g., used by the client application identifier subsystem 30) on particular nodes only serve a fraction of all clients, so there is no need to distribute information about all clients to all application nodes. This reduces negative impact on system efficiency. Localization of client information on a subset of servers greatly improves network and storage performance, and enables linear capacity scaling (e.g., just by adding servers to the system).

The directory service (e.g., information directory service) provides a list of known servers, where each server is tagged or associated with all the application services it supports. In some embodiments, this list may be generated as follows as servers become "on-line" and/or otherwise available. Initially, a first server becomes "on-line" and/or otherwise available. A second server thereafter becomes "on-line" and/or otherwise available and is given the IP address of the first server. The second server subsequently sends a request to the first server for a list (or other definition) of all servers that are in the system 10 and known to the first server. After receiving a response from the first server, the second server sends a request to each additional server on the list (or other definition) for a list (or other definition) of all servers that are in the system 10 and known to such additional server. The list from the first server may initially consist of only the first server. Thus, the second server may not send any additional requests. However, the process may be repeated as each additional server becomes "on-line" and/or otherwise available and thus each additional server obtains a list (or other definition) of at least some of the servers in the system 10. Each server may also broadcast a list (or other definition) of servers known to such server, in which case, each server in the system will eventually have a list (or other definition) of each server in the system 10. In some embodiments, the list (or other definition) may also indicate the capabilities (e.g., application services) of each server on the list.

The directory services of a server may be used by one or more client computer systems to obtain a list (or other definition) of the servers that are in the system 10 and available to the one or more client computer systems. In some embodiments, a client may send a request to a server for such a list (or other definition). The client may thereafter receive a response with the list (or other definition) of servers that are in the system 10 and available to such client. In some embodiments, the client may send the request to any server in the system 10. In some other embodiments, the client may be required to send the request to one or more designated servers (e.g., a centralized directory service). Clients may occasionally refresh this information by querying directory servers (e.g., in real time, every few hours or days, etc.).

FIG. 6 is a graphical representation of a list (or other definition) that may be received by one of the one or one or more clients 22, in accordance with some embodiments.

Referring to FIG. 6, the list (or other definition), which is shown in the form of a table 600 having a plurality of entries, e.g., entries 602-628, indicating all of the servers 12 that are in the system 10 and available to the client that requested the list. In the illustrated embodiment, each entry is associated with a particular one of the plurality of servers 12 available to the client, and indicates: (i) an IP address or other identifier for the server associated with the entry and (ii) one or more capabilities (e.g., application services) of such server.

For example, a first entry 602 indicates an IP address, e.g., IP address$_1$, associated with a first server available to the client. The first entry 602 further indicates the capabilities of such first server, e.g., real time communication. A third entry 606 indicates an IP address, e.g., IP address$_3$, associated with a third server available to the client and further indicates the capabilities of such third server, e.g., real time communication and storage. A ninth entry 618 indicates an IP address, e.g., IP address$_9$, associated with a ninth server available to the client and further indicates the capabilities of such ninth server, e.g., storage. In some embodiments, each IP address may comprise a 32 bit IP address.

In some embodiments, a client may receive and/or generate a separate list for each type of server capability (e.g., application service).

FIG. 7 is a graphical representation of a list (shown in the form of a table 700) of the servers 12 that are available to the client and have the capability of real time communication.

FIG. 8 is a graphical representation of a list (shown in the form of a table 800) of the servers 12 that are available to the client and have the capability of storage.

Figure 2:
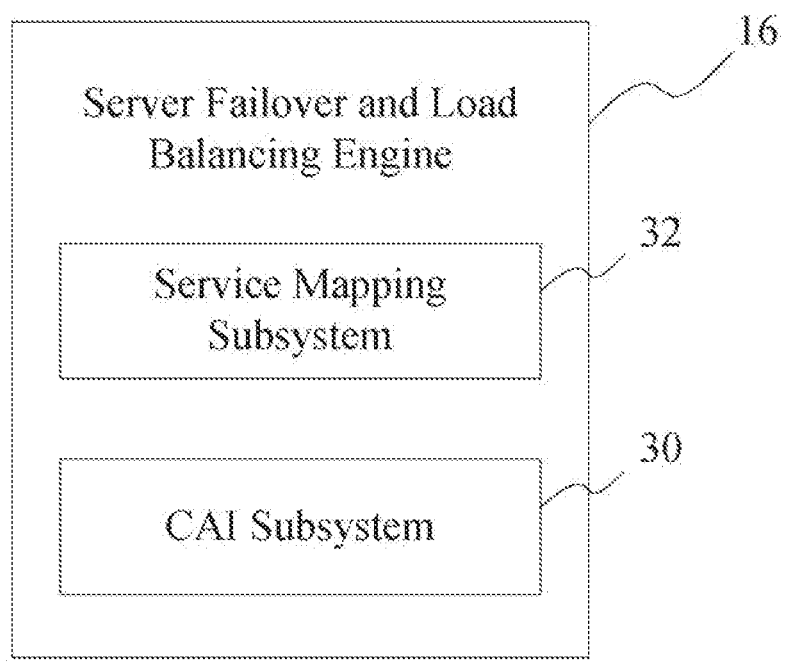
FIG. 2 is a diagram illustrating subsystems of a failover and load balancing engine, in accordance with some embodiments.

FIG. 2 is a diagram illustrating subsystems of a server failover and load balancing engine, e.g., one of server failover and load balancing engines 16a-16c, in accordance with some embodiments.

Referring to FIG. 2, in accordance with some embodiments, each server failover and load balancing engine, e.g., server failover and load balancing engines 16a-16c, may include a CAI subsystem 30 and a service mapping subsystem 32.

The CAI subsystem 30 facilitates failover, scaling, and/or locality of the client information. The CAI subsystem 30 associates a client application identifier (CAI) with a particular application of a particular client or group of particular clients. For example, the CAI subsystem 30 can include a real time communication session between two or more clients, use of read/write storage by one or more clients, streaming audio/video content from one client to a group of clients, application servicing a group of clients (e.g., payroll), etc. The CAI subsystem 30 defines a partition of the server system used to service a particular set of clients. This limits data and communication to the subset of the entire system, and enables scaling. The redundancy requirements are defined for each particular case within the partition (e.g., subset). If state (e.g., data) retention is involved, then the redundancy factor (e.g., two or greater) determines the replication within the subset, and subset size. If there is only a real-time component (e.g., for real time communication or live video streaming), the entire system can be involved so the redundancy factor is equal to the number of servers in the entire system. In all these cases, two or more clients that have agreed on the same CAI will always select the same server or the same subset of servers. One possible embodiment of the CAI is a large number (e.g., 128, 512, or more bits), kept secret from outsiders. It can be self-assigned (e.g., by insiders by a random choice), which can practically eliminate all collisions due to the large quantity of available possible numbers. Other embodiments are also envisioned (e.g., centralized or semi-centralized assignments). It should be understood by those of ordinary skill in the art that any suitable assignment system, method or protocol may be used.

The service mapping subsystem 32 maps each CAI to a particular server or a server subset for proper functioning of the system. Two or more clients that have agreed on the same CAI will always select the same server or the same subset of servers. This mapping works in the absence of a real-time directory service. Other than a recent directory map of the system, no other external information is required. One possible mapping method that could be used with the system is Highest Random Weight (HRW). See, e.g., https:// en.wikipedia.org/wiki/Rendezvous_hashing, the entirety of which is incorporated herein by reference.

Figure 3:
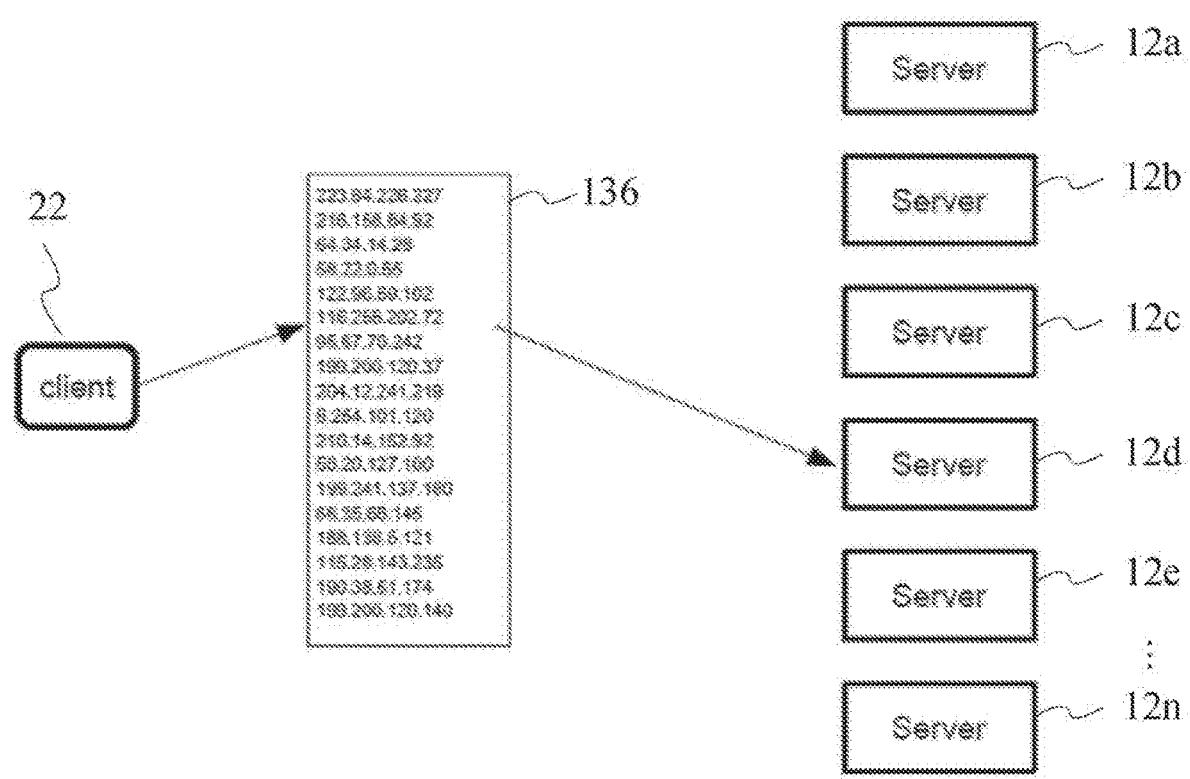
FIG. 3 is a diagram illustrating a client communicating with a server, in accordance with some embodiments.

FIG. 3 is a diagram showing one of the one or more clients 22 communicating with one of the plurality of servers 12 using a list of server IP addresses 136, in accordance with some embodiments.

Referring to FIG. 3, in accordance with some embodiments, the system 10 may generate and/or otherwise provide a directory list of servers that are available to the client (with server identities represented by IP addresses). The server failover and load balancing engine in the client 22 may combine the CAI with IP addresses of servers are available to the client and provide the desired application (e.g., real time communication and/or other function) and may perform the HRW method on this list of combinations, to generate a CAI-specific sorted list of servers 136 that provide the desired application (e.g., real time communication and/or other function). In other words, the engine may sort the list by HRW (CAI, IP).

The client 22 may select a server (e.g., server 12a) from the CAI-specific sorted list of servers 136 by starting at the top of the list, and if the server at the top of the list is unavailable, the next N-1 servers 12b-12n may be tried in succession, where N is the redundancy factor. Eventually, the client 134 selects an available server (e.g., server 12d) and establishes connection with that server (e.g., server 12d).

For example, if two clients wish to establish a communication link between them, mediated by a "communication application," the clients agree on a CAI, and run the above-described HRW algorithm. Because the directory map of both clients is identical, each of the clients will come up with the same sorted list, and will pick the same working server from that list. As there is no state in this case, all servers providing this "communication application" can be on the list, providing high redundancy.

FIG. 9 is a graphical representation of a list (or other definition) prior to sorting after hashing, in accordance with some embodiments.

Referring to FIG. 9, the list (or other definition) is shown in the form of a table 900 having a plurality of entries, e.g., entries 902-916. In the illustrated embodiment, each entry is associated with a particular one of the plurality of servers 12 and indicates: (i) the IP address or other identifier for the server associated with the entry, a combination of the CAI and the IP address of the server (e.g., concatenation of IP address and CAI) and (iii) a hash out value that results from hashing the combination of the CAI and the IP address of the server.

For example, a first entry 902 indicates an IP address, e.g., IP address$_1$, associated with a first server, a combination (e.g., IP address$_1$ & CAI) ) of such IP address and the CAI, and a hash out value, e.g., hash out$_1$, that results from hashing the combination. In some embodiments, each IP address comprises 32 bit IP address, the CAI comprises 128 bits and the combination of the IP address and the CAI comprises 160 bits. In some embodiments, the agreed on CAI comprises a 128 bit identifier representing a telephone number.

FIG. 10 is a graphical representation of the list (or other definition) of IP addresses shown in table 900 after sorting based on the hash out values in the table 900, in accordance with some embodiments.

Referring to FIG. 10, the sorted list (or other definition) is shown in the form of a table 1000 having a plurality of entries, e.g., 1002-1016. For purposes of illustration, it has been assumed that the hash out values in the table 900 define the following descending sequence of hash out values (greatest to smallest): hash out$_7$, hash out$_3$, hash out$_1$, hash out$_2$, hash out$_6$, hash out$_5$, hash out$_4$, hash out$_8$.

As stated above, the sorted list is not limited to the forms described above. In accordance with some embodiments, the sorted list may comprise any type(s) of information, in any form(s), that defines an order in which to attempt to contact servers until at least one functioning one of the servers is contacted.

The above communication examples is just one non-limiting example, and many other applications are possible as should be understood by those of ordinary skill in the art.

In another example, a group of clients belonging to the same business wants to access payroll. They all agree on a CAI, and select a functioning server, which has access to payroll data related to this group (e.g., defined by CAI). The application services in this case have state (e.g., payroll information), and a redundancy requirement with factor N, usually greater than 1. To achieve this, in some embodiments, each payroll application service (and/or other portion of the functioning server), when it receives a request/session from a particular client, also receives CAI, and calculates (or otherwise generates) the HRW sorted list itself. Then it finds the first N servers on the list (e.g., one of them is itself), and replicates all payroll information for this CAI to the other N-1 servers on the list. In some embodiments, the functioning server receives the HRW sorted list (or a portion thereof) from the requesting client and does not generate the HRW sorted list itself. In some embodiments, the functioning server does not replicate the information to the other N-1 servers on the list. In the latter embodiments, the requesting client may replicate the information to the other N-1 servers.

FIG. 11 is a graphical representation of a list (or other definition) prior to sorting after hashing, in accordance with some embodiments.

Referring to FIG. 11, the list (or other definition) is shown in the form of a table 1100 having a plurality of entries, e.g., entries 1102-1116. In the illustrated embodiment, each entry is associated with a particular one of the plurality of servers 12 and indicates: (i) the IP address or other identifier for the server associated with the entry, a combination of the CAI and the IP address of the server (e.g., concatenation of IP address and CAI) and (iii) a hash out value that results from hashing the combination of the CAI and the IP address of the server.

For example, a first entry 1102 indicates an IP address, e.g., IP address$_3$, associated with a third server, a combination (e.g., IP address$_3$ & CAI) ) of such IP address and the CAI, and a hash out value, e.g., hash out$_3$, that results from hashing the combination. In some embodiments, each IP address comprises 32 bit IP address, the CAI comprises 104 bits and the combination of the IP address and the CAI comprises 136 bits.

FIG. 12 is a graphical representation of the list (or other definition) of IP addresses shown in table 1100 after sorting based on the hash out values in the table 1100, in accordance with some embodiments.

Referring to FIG. 12, the sorted list (or other definition) is shown in the form of a table 1200 having a plurality of entries, e.g., 1202-1216. For purposes of illustration, it has been assumed that the hash out values in the table 1100 define the following descending sequence of hash out values (greatest to smallest): hash out$_7$, hash out$_3$, hash out$_9$, hash out$_{10}$, hash out$_6$, hash out$_5$, hash out$_4$, hash out$_8$.

In some embodiments, the client sends the selected server information to identify a record (of any size) within the selected server at which to store the data (if the data is being stored) and/or from which to retrieve the data (if the data is being retrieved). In some embodiments, the information comprises 128 bits. In some embodiments, the information may comprise the CAI, which the selected server may use as a key to identifies a partition within the selected server, and a record number that identifies a record within the identified partition. In some embodiments, the CAI used to identify the partition may comprise 104 bits and the record number used to identify the record within the storage partition may comprise 24 bits.

As stated above, the sorted list is not limited to the forms described above. In accordance with some embodiments, the sorted list may comprise any type(s) of information, in any form(s), that defines an order in which to attempt to contact servers until at least one functioning one of the servers is contacted.

The above storage example is just one more non-limiting example, and many other applications are possible as should be understood by those of ordinary skill in the art.

Figure 4:
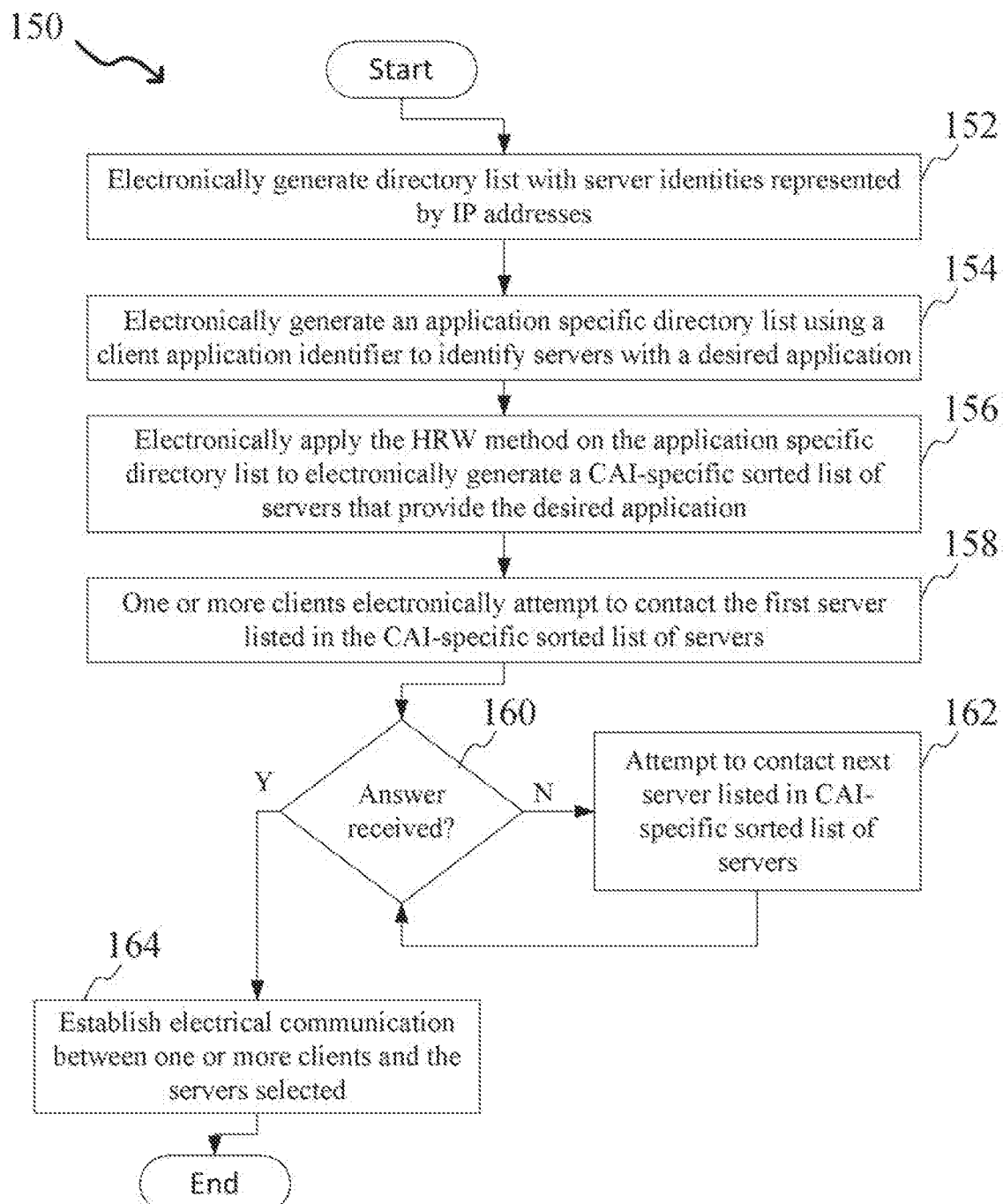
FIG. 4 is a flowchart of a process, in accordance with some embodiments.

FIG. 4 is a flowchart of the process 150, in accordance with some embodiments. In step 152, the system 10 electronically (or otherwise) generates a directory list with server identities represented by IP addresses. In step 154, the system electronically (or otherwise) generates an application specific directory list using a client application identifier to identify servers with a desired application. In step 156, the client electronically (or otherwise) applies the HRW method on the application specific directory list to electronically (or otherwise) generate a CAI-specific sorted list of servers that provide the desired application. In step 158, one or more clients attempt to contact the first server listed in the CAI-specific sorted list of servers. In step 160, a determination is made as to whether an answer was received from the server selected. If not, then in step 162, the client attempts to contact the next server listed in the CAI-specific sorted list of servers. If so, then in step 164, an electrical or data communication is established between the one or more clients and the server selected.

Figure 13:
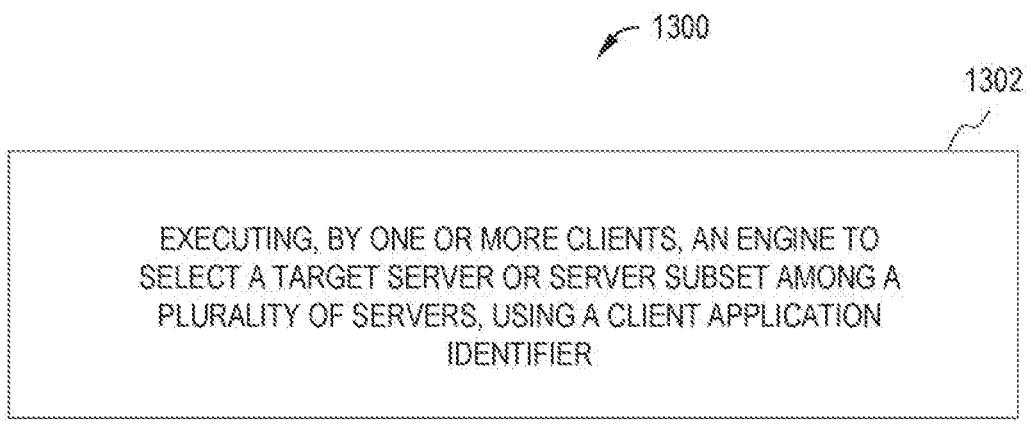
FIG. 13 is a flowchart of a process, in accordance with some embodiments.

FIG. 13 is a flow chart of a process 1300, in accordance with some embodiments.

In accordance with some embodiments, the method may be used in server failover and/or load balancing.

The method 1300 is not limited to the order shown in the flow chart. Rather, embodiments of the method 1300 may be performed in any order that is practicable. For that matter, unless stated otherwise, any method discussed herein may be performed in any order that is practicable.

Unless stated otherwise, the method 1300 (and/or any other method disclosed herein) may be performed by in any manner. In some embodiments, the method, (and/or any other method disclosed herein) or one or more portions thereof, may be performed by one or more portions of the system 10 and/or any other processing system.

In some embodiments, a non-transitory computer readable medium may have instructions stored thereon, which if executed by a machine result in performance of the method 1300 (and/or any other method disclosed herein) or one or more portions thereof.

Referring to FIG. 13, in accordance with some embodiments, at 1302, the method may include executing, by one or more clients, an engine to select a target server or server subset among a plurality of servers, using a client application identifier.

In some embodiments, two or more clients, using the same client application identifier, select the same target server or server subset.

In some embodiments, the engine includes a service mapping subsystem configured to map each client application identifier to the target server or server subset.

In some embodiments, the service mapping subsystem is configured to map said client application identifier using Highest Random Weight.

In some embodiments, the client application identifier comprises a large number.

In some embodiments, executing an engine to select a target server or server subset among a plurality of servers, using a client application identifier comprises: executing, by a first one of the one or more clients, an engine to select a target server or server subset among a plurality of servers, using a client application identifier; and executing, by a second one of the one or more clients, the engine to select the target server or server subset among the plurality of servers, using the client application identifier.

In some embodiments, executing an engine to select a target server or server subset among a plurality of servers, using a client application identifier comprises: receiving, by an engine executed by a client, information indicative of identifies of servers that provide a desired application; and generating, by the engine executed by the client, based at least in part on the information and a client application identifier, a client application identifier specific sorted list of servers that provide the desired application.

In some embodiments, the sorted list may comprise any type(s) of information, in any form(s), that defines an order in which to attempt to contact servers until at least one functioning one of the servers is contacted.

In some embodiments, the large number comprises at least 128 bits. In some embodiments, the large number comprises at least 512 bits.

Figure 5:
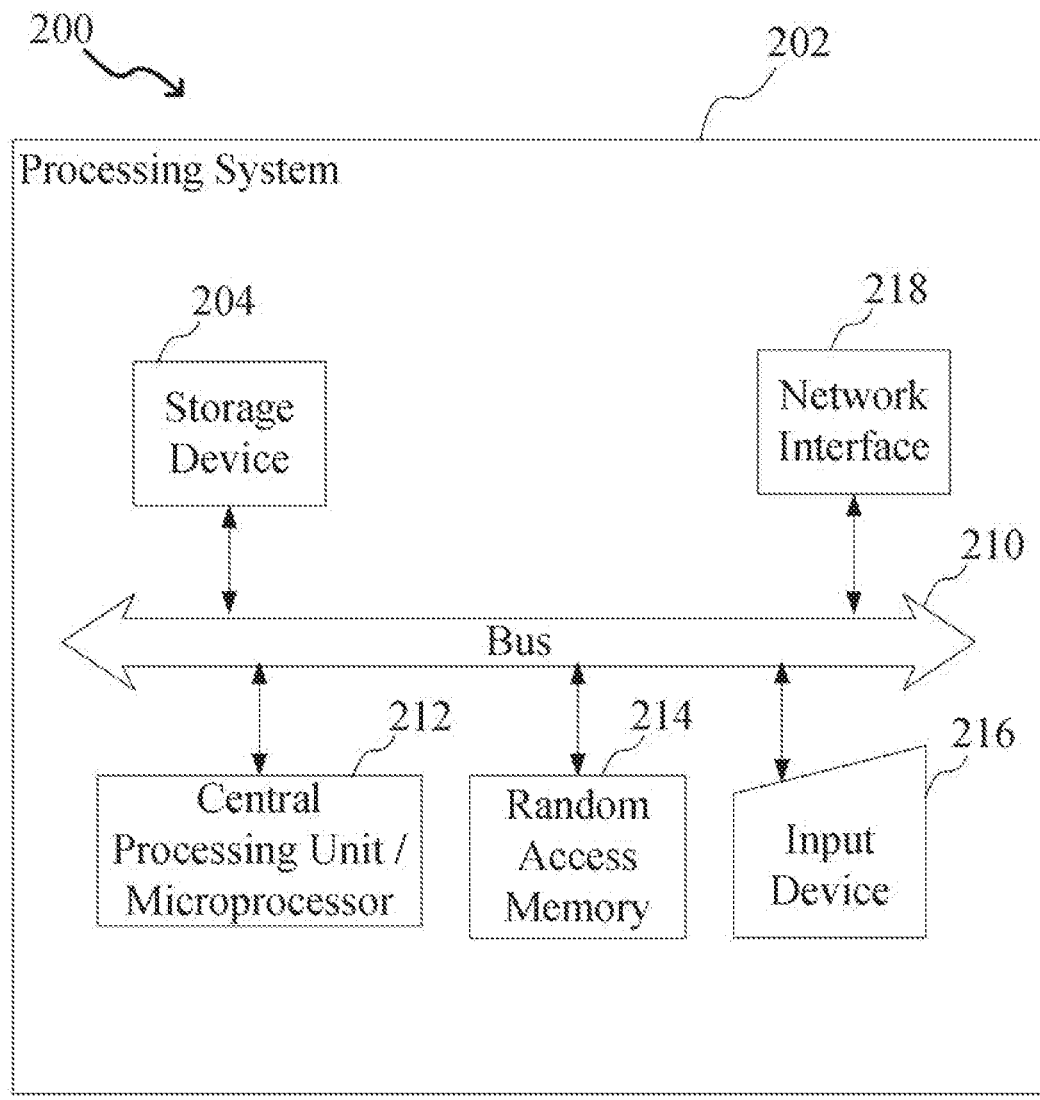
FIG. 5 is a diagram showing an architecture, in accordance with some embodiments.

FIG. 5 is a diagram showing an architecture 200, in accordance with some embodiments. In some embodiments, one or more of the systems and/or devices (and/or portion(s) thereof) disclosed herein may have an architecture that is the same as and/or similar to one or more portions of the architecture 200. In some embodiments, one or more of the plurality of servers 12 in the server failover and load balancing system 10 and/or one or more of the one or more clients 22 in the server failover and load balancing system 10 have an architecture that is the same as and/or similar to one or more portions of the architecture 200.

In some embodiments, one or more of the methods (or portion(s) thereof) disclosed herein may be performed by a system, apparatus and/or device having an architecture that is the same as or similar to the architecture 200 (or portion(s) thereof).

The architecture may be implemented as a distributed architecture or a non-distributed architecture. A distributed architecture may be a completely distributed architecture or a partly distributed-partly non distributed architecture.

Referring to FIG. 5, in accordance with some embodiments, the architecture 200 includes a processing system 202 that may include one or more of a storage device 204, a network interface 208, a communications bus 210, a central processing unit (CPU) (microprocessor) 212, a random access memory (RAM) 214, and one or more input devices 216, such as a keyboard, mouse, etc. The processing system 202 may also include a display (e.g., liquid crystal display (LCD), cathode ray tube (CRT), etc.). In some embodiments, the storage device 204 may comprise any suitable, computer-readable storage medium such as disk, non-volatile memory (e.g., read-only memory (ROM), erasable programmable ROM (EPROM), electrically-erasable programmable ROM (EEPROM), flash memory, field-programmable gate array (FPGA), etc.). In some embodiments, the processing system 202 may comprise a networked computer system, a personal computer, a smart phone, a tablet computer etc. In some embodiments, a server failover and load balancing engine 16 may be embodied as computer-readable program code stored on the storage device 204 and executed by the CPU 212 using any suitable, high or low level computing language, such as, for example, Python, Java, C++, C# , .NET, MATLAB, etc. In some embodiments, the network interface 208 may include an Ethernet network interface device, a wireless network interface device operable with one or more suitable wireless protocol, or any other suitable device that permits the server 202 to communicate via the network. In some embodiments, the CPU 212 may include any suitable single or multiple-core microprocessor of any suitable architecture that is capable of implementing and running the server failover and load balancing engine 16. In some embodiments, the random access memory 214 may include any suitable, high-speed, random access memory typical of most modern computers, such as dynamic RAM (DRAM), etc.

Unless stated otherwise, any process (sometimes referred to herein as a method) disclosed herein is not limited to an order shown in a flow chart. Rather, embodiments may be performed in any order that is practicable.

Unless stated otherwise, any method disclosed herein may be performed in any manner. In some embodiments, a method (or one or more portions thereof) may be performed by one or more portions of the system 10.

In some embodiments, a non-transitory computer readable medium may have instructions stored thereon, which if executed by a machine result in performance of any one or more methods (or one or more portions thereof) disclosed herein.

Unless stated otherwise, a processor may comprise any type of processor. For example, a processor may be programmable or non-programmable, general purpose or special purpose, dedicated or non-dedicated, distributed or non-distributed, shared or not shared, and/or any combination thereof. A processor may include, but is not limited to, hardware, software, firmware, and/or any combination thereof. Hardware may include, but is not limited to off the shelf integrated circuits, custom integrated circuits and/or any combination thereof. In some embodiments, a processor comprises a microprocessor. Software may include, but is not limited to, instructions that are storable and/or stored on a computer readable medium, such as, for example, magnetic or optical disk, magnetic or optical tape, CD-ROM, DVD, RAM, EPROM, ROM or other semiconductor memory. A processor may employ continuous signals, periodically sampled signals, and/or any combination thereof. If a processor is distributed, two or more portions of the control/storage circuitry may communicate with one another through a communication link.

Unless stated otherwise, a processing system is any type of system that includes at least one processor.

Unless stated otherwise, a communication link may be any type of communication link, for example, but not limited to, wired (e.g., conductors, fiber optic cables) or wireless (e.g. acoustic links, electromagnetic links or any combination thereof including, for example, but not limited to microwave links, satellite links, infrared links), and/or combinations thereof, each of which may be public or private, dedicated and/or shared (e.g., a network). A communication link may or may not be a permanent communication link. A communication link may support any type of information in any form, for example, but not limited to, analog and/or digital (e.g., a sequence of binary values, i.e. a bit string) signal(s) in serial and/or in parallel form. The information may or may not be divided into blocks. If divided into blocks, the amount of information in a block may be predetermined or determined dynamically, and/or may be fixed (e.g., uniform) or variable. A communication link may employ a protocol or combination of protocols including, for example, but not limited to the Internet Protocol.

Unless stated otherwise, the term "receiving" means receiving in any manner(s) from any source(s) internal and/or external.

Unless stated otherwise the term "define" means "define directly and/or indirectly".

Unless stated otherwise, terms such as, for example, "in response to" and "based on" mean "in response at least to" and "based at least on", respectively, so as not to preclude being responsive to and/or based on, more than one thing.

Unless stated otherwise, terms such as, for example, "coupled to", "send to" and "receive from" mean "coupled directly and/or indirectly to", "send directly and/or indirectly to" and "receive directly and/or indirectly from", respectively.

Unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

Having thus described the system and method in detail, it is to be understood that the foregoing description is not intended to limit the spirit or scope thereof. It will be understood by those of ordinary skill in the pertinent art that the embodiments of the present disclosure described herein are merely exemplary and that a person skilled in the art, based on the teachings herein, may make any numerous variations and modifications without departing from the spirit and/or scope of the disclosure. All such variations and modifications, including those discussed above, are intended to be included within the scope of the disclosure. By way of example only, the disclosure contemplates, but is not limited to, embodiments having any one or more of the features set forth in the above description in any combination with each other. By way of another example only, the disclosure contemplates, but is not limited to, embodiments that do not include any one or more of the features set forth in the above description. Accordingly, the description of embodiments herein is to be taken in an illustrative as opposed to a limiting sense, and neither the invention nor the disclosure is limited to the particular embodiments combinations of features described herein.

What is claimed is:

1. A method for server load balancing using a client device, the method comprising:
    receiving, at a client device, a directory list with server identities for a plurality of servers, each server associated with a random client application identifier, the random client application identifier being associated with an application executed by the client device;
    generating, at the client device, a sorted list for the plurality of servers from the directory list, the sorted list being generated based at least in part on the random client application identifier using Highest Random Weight; and
    contacting, by the client device, a selected server from the sorted list by starting at the top and working down the sorted list until an answer is received from one of the plurality of servers;
    establishing, by the client device, communication with the selected server.

2. The method of claim 1, wherein the random client application identifier comprises at least 128 bits.

3. The method of claim 1, wherein the random client application identifier comprises at least 512 bits.

4. The method of claim 1, wherein the server identifies comprise an IP address.

5. The method of claim 1, wherein each of the plurality of servers are configured to provide a directory service.

6. The method of claim 5, wherein the directory service is configured to provide a list of servers tagged with one or more application services each server supports.

7. The method of claim 1, wherein each of the plurality of servers are configured to provide an application service.

8. The method of claim 7, wherein the application service serves only a subset of a plurality of client devices.

9. A client device configured to be in communication with a plurality of servers, the client device comprising one or more processors configured to execute computer-readable instructions to configure the client device to perform operations, the operations comprising:
    receiving, at the client device, a directory list with server identities for the plurality of servers, each server associated with a random client application identifier, the random client application identifier being associated with an application executed by the client device;
    generating, at the client device, a sorted list for the plurality of servers from the directory list, the sorted list being generated based at least in part on the random client application identifier using Highest Random Weight; and
    contacting, by the client device, a selected server from the sorted list by starting at the top and working down the sorted list until an answer is received from one of the plurality of servers;
    establishing, by the client device, communication with the selected server.

10. The system of claim 9, wherein the random client application identifier comprises at least 128 bits.

11. The system of claim 9, wherein the random client application identifier comprises at least 512 bits.

12. The system of claim 9, wherein the server identifies comprise an IP address.

13. The system of claim 9, wherein each of the plurality of servers are configured to provide a directory service.

14. The system of claim 13, wherein the directory service is configured to provide a list of servers tagged with one or more application services each server supports.

15. The system of claim 9, wherein each of the plurality of servers are configured to provide an application service.

16. The system of claim 15, wherein the application service serves only a subset of a plurality of client devices.

* * * * *